UNITED STATES PATENT OFFICE.

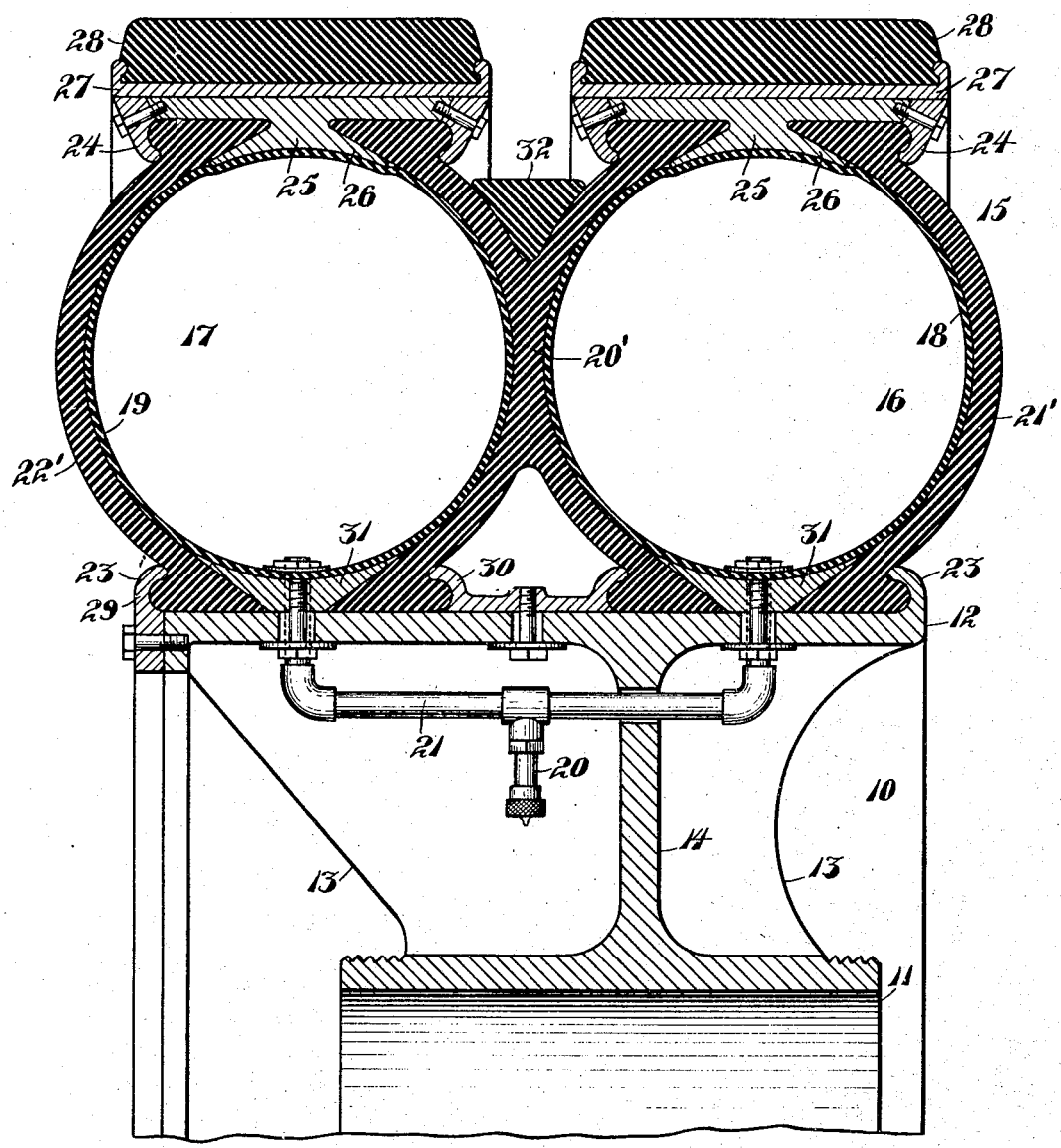

ALEXIS JAKOVLEFF, OF SAN FRANCISCO, CALIFORNIA, ASSIGNOR TO JAK TIRE CORPORATION, OF SAN FRANCISCO, CALIFORNIA, A CORPORATION OF CALIFORNIA.

DUAL SECTIONAL PNEUMATIC TIRE.

1,335,711.   Specification of Letters Patent.   Patented Mar. 30, 1920.

Application filed July 9, 1918, Serial No. 244,063.   Renewed August 18, 1919.   Serial No. 318,311.

*To all whom it may concern:*

Be it known that I, ALEXIS JAKOVLEFF, a subject of the Emperor of Russia, residing at the city and county of San Francisco and State of California, have invented new and useful Improvements in Dual Sectional Pneumatic Tires, of which the following is a specification.

This invention relates to a dual pneumatic tire of sectional formation.

It has been found desirable to provide pneumatic tires for heavy duty. Such structures, however, have been objectionable, due to their design, and the fact that they could not be readily repaired, but required that they be discarded, and an entirely new tire structure provided. A further disadvantage has been he fact that the local wear upon the tread of the tires has been considerable, and that the heavy loads imposed upon the tire cause the tread to rapidly wear away. With these objects in mind it has been the principal object of the present invention to provide a heavy dual pneumatic tire, which may be applied to vehicle wheels of standard dimension, and which is constructed in a manner to allow the various tire parts to be interchanged and replaced without discarding the entire structure.

It is a further object of this invention to provide removable treads and mountings therefor which serve the double purpose of binding together the tire segments as well as allowing for the ready replacement of the tread portions.

Another object is to provide pressure equalizing means so that the compression exerted by the load carried by the wheel will be equally distributed throughout the various tubes of the tire, and will, therefore, decrease the internal atmospheric pressure in any one of the tire tubes, thus reducing the possibility of blowout.

Further objects will appear hereinafter.

Referring more particularly to the drawings, the figure illustrates a sectional view taken radially of a wheel and tire of the construction with which the present invention is concerned, and particularly discloses the correlation of the sectional parts of the tire structure.

Referring more particularly to the drawing, 10 indicates a vehicle wheel. This wheel is here shown as formed of metal, and has a hub 11 and an outer felly 12 cast integral. These members are united by spokes 13 and intervening webs 14. It will be understood, however, that the present invention is not particularly concerned with the wheel construction, except as a mounting for a dual pneumatic tire 15.

The tire 15 is here shown as formed with two pneumatic chambers 16 and 17, which are made by pneumatic tubes 18 and 19. It is to be understood that these tubes are of common construction, and that they may be simultaneously inflated through a stem 20. In order that the inflation of the two tubes shall be equal, and that there shall be an equalization of pressure after the inflation has been completed, the stem 20 unites with a common supply pipe 21, the opposite ends of which are in communication with the separate tire tubes.

The two tire tubes 18 and 19 are inclosed within casings, which are composed of circumferential extending sections. This is done in order to allow the tubes to be readily removed when desired, or to be repaired. In the present instance either tube may be reached without molesting the other tubes. This is accomplished by providing a common central casing section 20', which forms contiguous side walls for the two tubes and outer casing sections 21' and 22', which are complementary to the dual central section and complete the chamber for both of the tubes. As the sections 21' and 22' are in duplicate they may be interchanged, and it will be understood that they may be interchanged. In each case the outer casing sections are formed with laterally extending flanges projecting from either the inner or outer circumferential edges, which provide gripping means for groove-shaped clamping flanges. The inner circumferential flanges are engaged by clamping flanges 23 formed upon the felly of the wheel, while the outer flanges of the casing are engaged by removable clamping flanges 24, which are detachably secured to binding members 25. The binding members are of peculiar design when considered in transverse sections in that they provide annular V shaped recesses into which the contiguous tapering ends of the casing sections are adapted to rest. Due to this V formation a T shaped tongue 26 is thus provided to bind the free edges of the tire casing sections, and to properly protect the tubes inclosed by the casings from pinching or chafing along the joint of the casing sections.

The binding rings 25 are provided as a mounting for tire rims 27. These rims are oppositely flanged to receive resilient tires 28. As will be understood these tires are, in fact, replaceable treads, which may be easily renewed, which, in reality, receive the major portion of the wear delivered to the tire structure.

The tires are mounted upon the wheel and securely held by two removable fastening members; outer flange 29 corresponding in sectional formation to the flange 23 upon the wheel, and intermediate clamping ring 30 having opposite flanges which engage the lateral annular flanges upon the central section of the tire casing. Suitable bolts are provided to secure the flanges and ring to the body of the wheel, and thus hold the entire structure in rigid relation to the wheel, at the same time affording a demountable connection thereto.

In operation of the present device a wheel is provided having a permanent flange 23, over the wheel are then passed the casing sections 18 and 20. These sections are securely positioned upon the wheel by the flange ring 30, after which the outer section 19 may be secured in place by the clamping ring 29. In order to properly hold the inner contiguous edges of the casing sections in position filler rings 31 are placed between the casing sections, which will conform to the bevel inner faces thereof, and hold the edges of the sections in place. These rings are preferably held in position by the threaded stems of the inflating tubes. It will thus be noted that all of the casing sections are in position, and that their outer edges may be separated to permit the tubes 16 and 17 to be inserted. When these tubes are in proper position the free edges of the casing sections may be placed in register with the V shaped grooves of the binding rings 25, after which the clamping flanges 24 are drawn in the position by the cap screws, and the casing sections rigidly combined to form two pneumatic tube compartments. In order to reinforce the central casing section and to, in a measure, equalize the pressure exerted to the circumference of the tire treads, a resilient wedge ring 32 is interposed between the oppositely and outwardly extending free ends of the central casing section.

An examination of the structure here disclosed will show that a heavy duty tire is provided having a plurality of pneumatic air chambers, which may be rigidly formed, and the parts of which may be repaired or interchanged as desired.

Attention is directed to the retaining ring 25 by which the contiguous edges of the casing parts are held. This ring and the complementary clamping rings 24 may be used in connection with a single tube tire and will in this case afford means for properly gripping and binding the casing parts to prevent separation and to provide an inclosure for a pneumatic tire.

Having thus described my invention, what I claim and desire to secure by Letters Patent is—

1. A pneumatic tire comprising a casing of composite construction including a series of outer and intermediate casing sections, detachable treads adapted to be disposed therearound, and means for securing the sections to each other and in relation to the treads whereby annular compartments will be formed for pneumatic tubes.

2. A pneumatic tire comprising a composite casing having an intermediate casing section and opposite separate casing sections adapted to combine with said intermediate section to form a pair of inflation chambers, means for securing the inner edges of said sections together, and a pair of bands adapted to circumscribe the complementary outer ends of said sections to complete the casing structure.

3. In a heavy duty tire, the combination of a rim, twin pneumatic casings mounted thereon, each of said casings having an independent detachable tread, said casings being sectionally divided on circumferential lines and the adjacent sections being integrally connected.

4. In a heavy duty tire, the combination with a wheel rim, of a pair of casings mounted thereon side by side, each of said casings being circumferentially divided into complementary sections, the adjacent sections being formed integral with one another, and means for uniting the sections and treads for the casings.

5. In a pneumatic tire, a central casing section having two parts arranged in side by side relation and having their inner sides integrally united at points between the inner circumferences and peripheries of the sections, said parts having inner circumferential flanges below the line of union between the parts and extending toward said line, outer casing sections for the respective parts of the central casing, means common to and engaging each of the flanges and arranged below the line of union for simultaneously securing both flanges in position, and means to secure the peripheries of the outer casing sections together.

6. In a pneumatic tire, a central casing section having two parts arranged in side by side relation and having their inner sides integrally united at points between the inner circumferences and peripheries of the sections said parts having inner circumferential flanges below the line of union between the parts and extending toward said line, outer casing sections for the respective parts of the central casing section, a filler ring arranged between and engaging the outer side face of the respective parts of the central casing section and disposed to overlie and engage the line of union, means common to and engaging each of the flanges and arranged below the line of union for simultaneously securing both flanges in position, and means to secure the peripheries of the outer casing sections together.

7. In a pneumatic tire, a unitary central casing section composed of two curved parts integrally connected at the centers of the peripheries thereof, complementary outer casing sections for the respective curved parts of the central section, and means to detachably connect the outer sections in relation to the central section to form pneumatic tube-receiving compartments.

8. A pneumatic tire including a plurality of annular inflation chambers integrally united at their adjacent inner faces, and independently detachable treads for the respective chambers.

9. A pneumatic tire including a central casing section of substantially X-shape in cross section, outer casing sections detachably secured thereto to form annular pneumatic tube-receiving compartments, and means to fixedly secure the inner circumferential edges of the central section in position so as to allow the outer sections to be removed without disturbing the central section.

10. A pneumatic tire including a central casing section of substantially X-shape in cross section, means to secure the inner circumferential edges of the section in position, a filler ring interposed between the outer faces of the peripheral portions of the section and in the space therebetween and complementary outer casing sections coöperating with the central section to form pneumatic tire-receiving compartments.

In testimony whereof I have hereunto set my hand in the presence of two subscribing witnesses.

ALEXIS JAKOVLEFF.

Witnesses:
ALVA MILLER,
CONSTANCE M. GAMMETER.